F. M. RUTTEN.
AUTOMATIC SAFETY ADJUSTABLE TRACTOR COUPLING.
APPLICATION FILED MAR. 24, 1921.
1,394,793.
Patented Oct. 25, 1921.
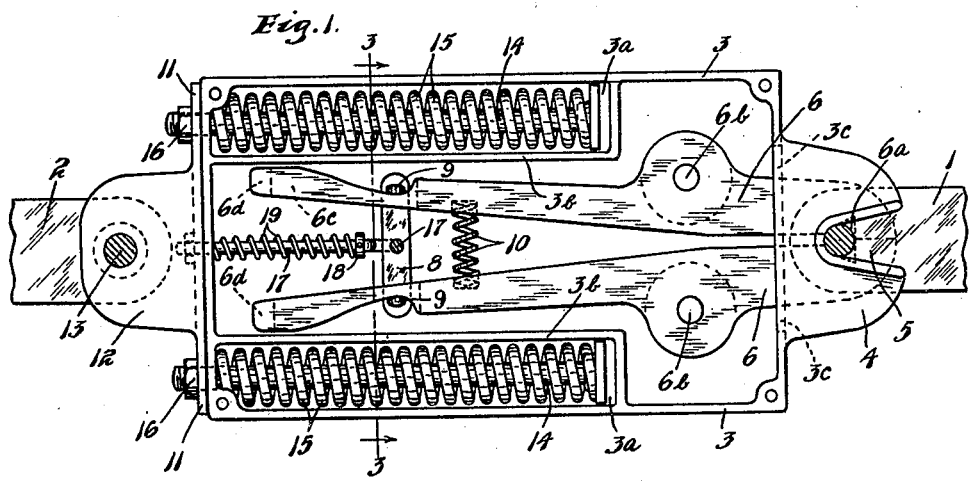
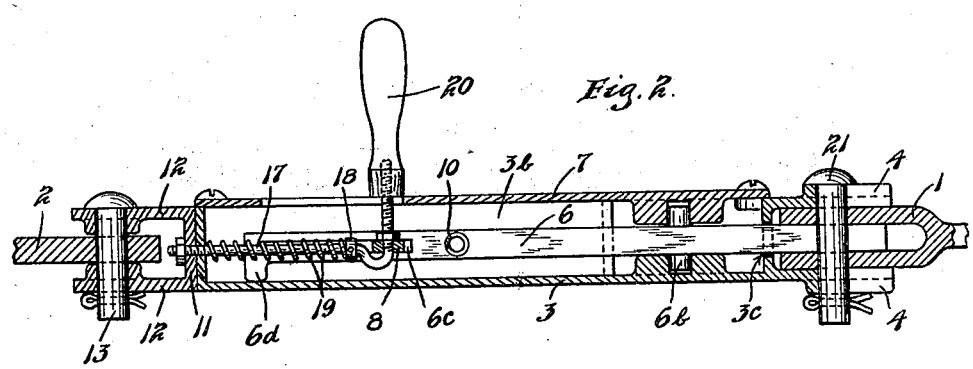
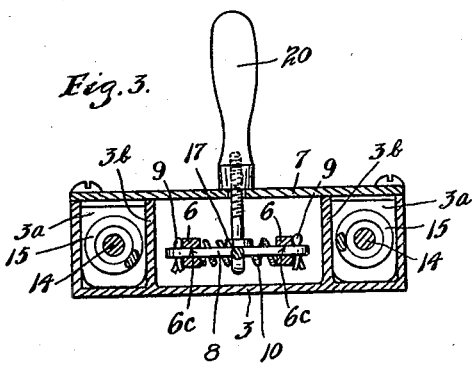
INVENTOR.
FRANK M. RUTTEN.
BY HIS ATTORNEY.
James F. Williamson

UNITED STATES PATENT OFFICE.

FRANK M. RUTTEN, OF GRAND FORKS, NORTH DAKOTA, ASSIGNOR TO ALBERT R. HILSABECK, OF GRAND FORKS, NORTH DAKOTA.

AUTOMATIC SAFETY ADJUSTABLE TRACTOR-COUPLING.

1,394,793.

Specification of Letters Patent. Patented Oct. 25, 1921.

Application filed March 24, 1921. Serial No. 454,995.

*To all whom it may concern:*

Be it known that I, FRANK M. RUTTEN, a citizen of the United States, residing at Grank Forks, in the county of Grand Forks and State of North Dakota, have invented certain new and useful Improvements in Automatic Safety Adjustable Tractor-Couplings; and I do hereby declare the following to be a full, clear, and exact description of the invention, such as will enable others skilled in the art to which it appertains to make and use the same.

This invention relates to a hitch adapted to be employed to connect a tractor or other pulling means with a plow vehicle or other object to be pulled or transported.

It is an object of this invention to provide a hitch which will resiliently draw the load and which will be disconnected from the tractor means if the load is suddenly stopped or extraordinary resistance is encountered.

It is a further object of the invention to provide such a hitch of few and simple parts and one which can be quickly and easily reconnected when the same has been disconnected.

These and other objects and advantages of the invention will be apparent from the following description made in connection with the accompanying drawings in which like reference characters refer to the same parts throughout the different views and, in which—

Figure 1 is a plan view of the hitch with the top plate of the casing removed;

Fig. 2 is a central vertical section taken longitudinally of the hitch; and

Fig. 3 is a transverse vertical section taken on line 3—3 of Fig. 1.

Referring to the drawings, the member 1 designates a portion of a link or clevis adapted to be connected in any ordinary way to the tractor or other drawing means. Numeral 2 designates a connection to the plow or other object to be drawn. The hitch proper comprises a casing 3 which in the embodiment of the invention illustrated is of general rectangular form and is provided with a pocket $3^a$ at each side thereof formed by the partition member $3^b$. Casing 3 is provided on its front end with vertically spaced lugs 4 which have alined slots 5 formed therein the sides of which diverge outwardly as shown. These slots are reinforced at their edges by raised ribs extending thereabout. The front wall of the casing is provided with a slot $3^c$ extending therethrough and the ends of a pair of members 6 extend through said slot. These members 6 are similarly formed but are oppositely disposed and the front ends thereof are curved to form a pair of jaws each of which is provided with a recess $6^a$ of generally triangular shape and the ends of these members beyond said recess are in contact. The members 6 are provided with pivots $6^b$ projecting from each side thereof and these pivots are received in holes formed in alining bosses which, as shown, are integral with the bottom of casing member 3 and the top plate 7 thereof. The rear ends of the members 6 diverge and are formed with curved recesses on their outer sides and are also provided near their rear ends with transversely extending slots $6^c$ of rectangular shape. A cross bar 8 extends between the members and through the said slots and is apertured adjacent its ends to receive small cotter pins 9 which extend therethrough and contact with the outer sides of the members 6. Members 6 are recessed a short distance in front of the bar 8 to receive a coil spring 10 extending therebetween. At their rear ends members 6 have depending portions $6^d$ adapted to contact with the bottom of the casing 3.

Adjacent the rear end of the casing 3 is a plate 11 of general rectangular shape and substantially of the same dimensions as the casing 3 from which extend spaced lugs 12 which are bored with alining holes to receive the pin or bolt 13 extending through said holes and a hole formed in the member 2. Pin 13 is held in place by a cotter key extending through its lower end. The rear end of casing 3 and plate 11 are bored at each side with alining holes which are located substantially in line with the centers of the pockets $3^b$ and headed bolts 14 have their ends extending through said holes and their heads disposed at the front ends of said pockets. Coiled springs 15 are disposed in said pockets about said bolts and the bolts have nuts 16 on their outer ends contacting with the outer side of the plate 11. It is obvious that by turning nuts 16, the tension of the springs 15 can be varied. A small rod 17 has its threaded end projecting through the front end of the casing 3 and plate 11 at substantially the transverse center thereof and this rod is provided with a nut on the outside of plate 11 and with the collar 18 in the casing 3 adjacent the bar 8. A comparatively light coiled spring 19 encircles the rod 17 and is disposed between the rear end of the casing 3 and the collar 18. At its front end the rod 17 as shown in Fig. 2 is bent to extend below the bar 8 and then to extend upwardly through a hole formed in the center thereof and out through a slot formed in the casing top 7. This end of the rod is threaded to receive a nut disposed in contact with the bar 8 and to also receive a handle 20 screwed into the outer end thereof which projects upwardly from the outer surface of the top 7. A headed pin or bolt 21 extends through the slots 5 and the recess in the front end of the members 6 formed by the joining recess 6ª and also through alining holes formed in the bifurcated end of the member 1, the arms of which embrace the front ends of the members 6 at the top and bottom sides thereof. The casing cover 7 is secured to the casing 3 by screws passing therethrough and through threaded holes tapped into the corners of said casing.

The operation of the device is as follows: The pulling stress will be applied to the member 1 and will be transmitted to the casing members 3 and 7 through the members 6. This stress will then be transmitted through the springs 15 to the bolts 14 and thus to the plate 11 and the member 2. If an unusual resistance is encountered causing extraordinary stress to be placed on the device, the springs 15 will be compressed and the plate member 11 will move away from the rear end of casing 3. This movement will draw rod 17 rearwardly which in turn will move the bar 8 rearwardly. The cotter pins or split keys 9 will slide against the outer sides in the members 6 and cause these members to move together. This will swing the members 6 about the pivots 6ᵇ and the front ends of the members will be moved out of contact. This will cause said members to be opened and the pin 21 will move out from between the rear ends and the members 6 so that the member 1 will be disconnected from the casing 3. When the pin 21 is moved out of the front ends of the members 6, the springs 14 will expand as will also the springs 19 and 10 and the members 6 will be again brought to the position shown in Fig. 1. When it is desired to reconnect the device, the springs 10 and 19 can be again compressed by moving the handle 20 and bar 8 rearwardly. This will reopen the front ends of members 6 and the pin 21 can be again engaged in the recess formed in the ends thereof. It will be noted that the front side of the recess holding the pin 21 is perfectly straight so that there is no tendency for this pin to cam open—the ends of members 6. It will also be noted that the device is thus reconnected without compressing the springs 14. It will, of course, be understood that either the member 1 or the member 2 can be connected to the tractor.

From the above description, it is clear that applicant has produced a simple, and efficient hitch and one which will be readily disconnected at the desired time under the desired conditions. The parts are all easily and ruggedly made so that they will have no tendency to become disarranged or out of order when once assembled. It will, of course, be understood, that various changes may be made in the form, details and arrangement of the device without departing from the scope of applicant's invention, which, generally stated, consists in the matter shown and described and set forth in the appended claims.

What is claimed is:

1. A tractor hitch having in combination two pivoted members having their front ends held in engagement and recessed to provide an opening for receiving a draft pin, a casing member carrying said pivoted members, a member yieldingly connected to said casing member and cam means connected to said last mentioned member and adapted to move the rear ends of the pivoted members together to separate the front ends thereof and release the draft pin.

2. A device of the class described comprising a pair of pivoted jaws yieldingly held together at one side of their pivot and adapted to receive a draft member therebetween, the ends of said jaws on the other side of said pivot diverging, and cam means for moving said last mentioned ends together to release said draft member when extraordinary stress is encountered.

3. A device of the class described comprising a pair of pivoted jaws yieldingly held together at one side of their pivot and adapted to receive a draft member therebetween, the ends of said jaws on the other side of said pivot diverging, yielding means holding said jaws in position, and cam means for moving said last mentioned ends together to release said draft member, when extraordinary stress is encountered.

4. In a device of the class described, comprising two recessed jaw members yieldingly held together to form a pocket therebetween, a draft member disposed in said pocket, a member by which said jaw members are carried, and cam means on said last mentioned member for separating said jaw members to release said draft member when extraordinary stress occurs on the draft member.

5. The structure set forth in claim 4, and guiding means on said second mentioned member for guiding said draft member between said jaw members.

6. The structure set forth in claim 4, and manual means for operating said cam means to separate said jaw members to receive the draft member.

In testimony whereof I affix my signature in presence of two witnesses.

FRANK M. RUTTEN.

Witnesses:
T. A. Toner,
A. R. Hilsabeck.